United States Patent [19]

Breed et al.

[11] Patent Number: 5,244,229
[45] Date of Patent: Sep. 14, 1993

[54] MECHANICAL CRASH SENSOR

[75] Inventors: Allen Breed, Boonton Township; Torbjorn Thuen, Morris Plains, both of N.J.

[73] Assignee: Breed Automotive Technology, Inc., Lakeland, Fla.

[21] Appl. No.: 976,554

[22] Filed: Nov. 16, 1992

Related U.S. Application Data

[63] Continuation of Ser. No. 715,493, Jun. 14, 1991, Pat. No. 5,197,755.

[51] Int. Cl.⁵ .............................................. B60R 21/32
[52] U.S. Cl. ..................... 280/734; 102/247; 180/282
[58] Field of Search .................. 280/734; 180/282; 102/247; 200/61.45 R, 61.46, 61.49; 73/514; 116/203

[56] References Cited

U.S. PATENT DOCUMENTS

| | | | |
|---|---|---|---|
| 4,573,706 | 3/1986 | Breed | 280/734 |
| 4,666,182 | 5/1987 | Breed | 280/734 |
| 4,955,638 | 9/1990 | Kinoshita et al. | 280/806 |
| 4,960,292 | 10/1990 | Sadler | 280/731 |
| 5,005,861 | 4/1991 | Breed et al. | 280/734 |
| 5,031,931 | 7/1991 | Thuen et al. | 280/735 |
| 5,039,125 | 8/1991 | Buma et al. | 280/734 |
| 5,080,394 | 1/1992 | Mori | 280/734 |

*Primary Examiner*—Eric D. Culbreth
*Attorney, Agent, or Firm*—Kane, Dalsimer, Sullivan, Kurucz, Levy, Eisele and Richard

[57] ABSTRACT

A mechanical sensor for a passenger restraint system includes several primers for activating a gas generating component, and a trigger for setting the primers off in response to a velocity change. The sensor also includes an inertial mass for sensing the change in velocity. The sensor and the restraint system coact to arm the sensor when the sensor is inserted into the system.

6 Claims, 5 Drawing Sheets

MECHANICAL CRASH SENSOR

This is a continuation of copending application Ser. No. 07/715,493 filed on Jun. 14, 1991, now U.S. Pat. No. 5,197,255.

RELATED APPLICATIONS

The subject matter of this application is related to application Ser. No. 447,108 filed Dec. 6, 1989 which is a continuation of application Ser. No. 418,228 filed Oct. 6, 1989, entitled A VELOCITY CHANGE SENSOR WITH SCREW ADJUSTMENT, now abandoned.

BACKGROUND OF THE INVENTION

A. Field of Invention

This invention pertains to a sensor used for triggering passenger restraint system in a motor vehicle such an air bag system, and more particularly to a self-contained mechanical sensor with disarming means whereby the sensor can be set off only when it is installed within a passenger restraint system.

B. Description of the Prior Art

Sensors for passenger restraint systems are used to detect passenger restraint systems for detecting a crash. These sensors must be able to discriminate between sudden changes in the velocity of a motor vehicle due to normal operations, and abrupt velocity changes which may result in injury to the passengers. These sensors are often placed in the crush zone of the vehicle because in this zone it is easier to discriminate between acceptable and dangerous velocity changes. However inherently such sensors are less reliable because they must be coupled electrically for mechanically with the rest of the restraint system. Several sensors have been suggested which are made physically integral with the passenger restraint system. In this manner the need for long electrical or mechanical coupling means is eliminated. However, until now, all these systems were complicated to make.

For example U.S. Pat. No. 4,167,276 discloses a sensor relying on a rolamite ball arrangement to sense a crash. The patent also discloses a complicated automatic interlock coupled to the rolamite ball arrangement.

Commonly assigned U.S. Pat. No. 4,666,182 discloses an all mechanical sensor with multiple inertial masses for the sake of redundance.

OBJECTIVES AND SUMMARY OF THE INVENTION

An objective of the present invention is to provide a mechanical sensor which is relatively uncomplicated so that it is easy and inexpensive to make.

A further objective is to provide a sensor with external adjusting means which allows for the adjustment of the sensor sensitivity.

Yet another objective is to provide a small sensor with redundancy to insure a proper operation. Other objectives and advantages of the invention shall become apparent from the following description. A mechanical sensor constructed in accordance with this invention includes a housing with an inertial mass movable along a path in response to a change of velocity. The mass reaches a preselected point along its path, it triggers a mechanically loaded mechanism which in turn sets of a primer. The primer in turn is used to ignite a gas generator means. The sensor includes arming means for arming the inertial mass only when the mass is in position within a passenger restraint system.

DETAILED DESCRIPTION OF THE INVENTION

Figure 2:
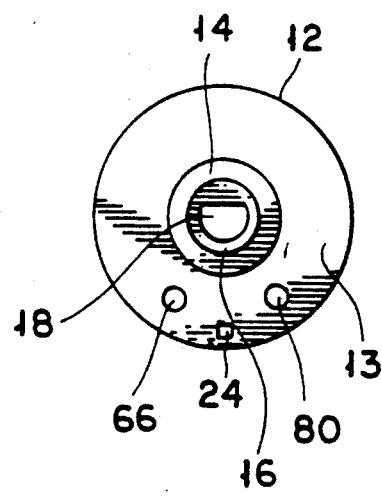
FIG. 2 shows an end view of the sensor of FIG. 1.
Figure 3:
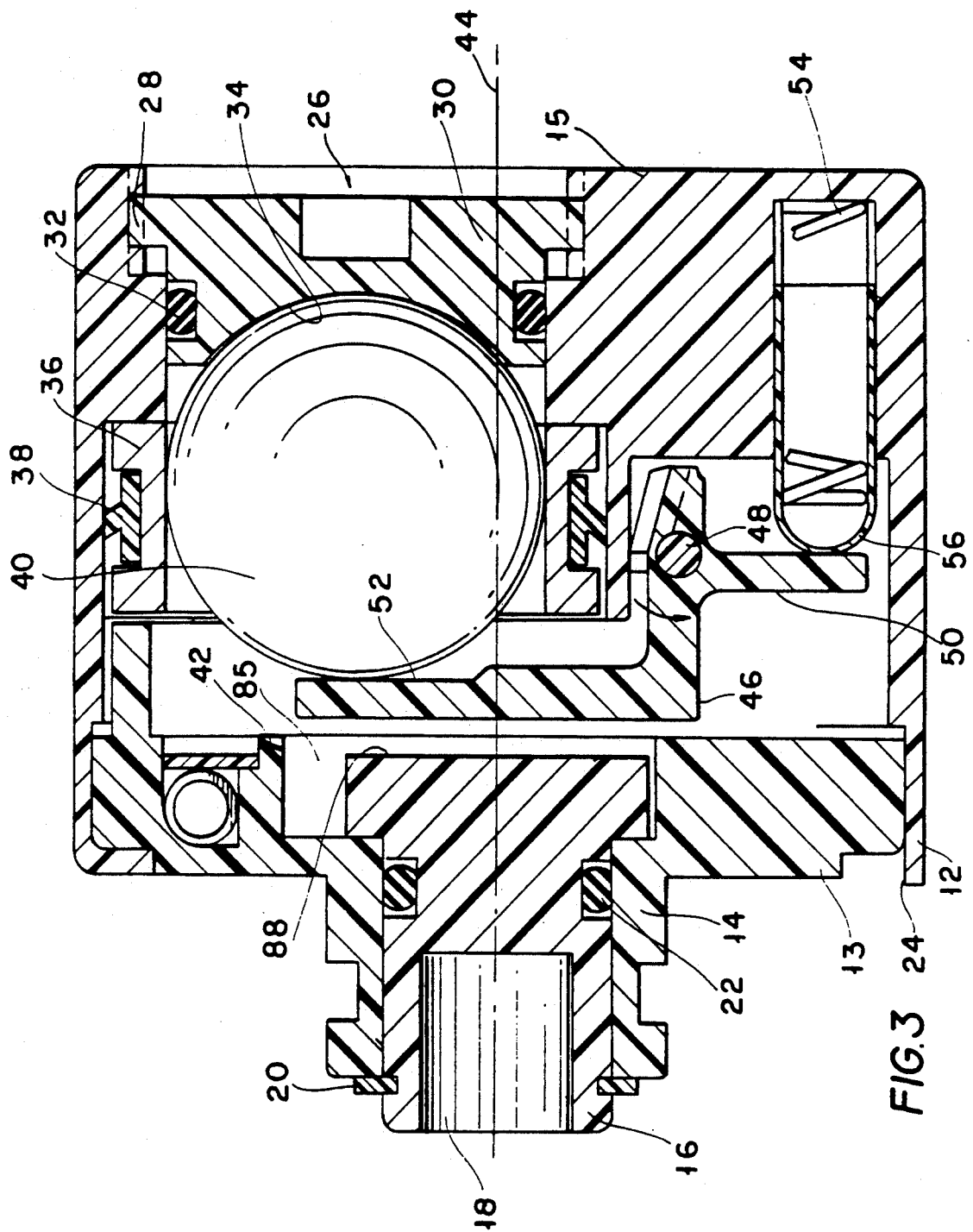
FIG. 3 shows side sectional view of the sensor with the ball in a first position.

Referring now to the Figures, a sensor 10 constructed in accordance with this invention includes a generally tubular wall 12 terminated with a cap 13. Cap 13 has an extension 14 at one end. The other end 15 of the wall 12 is closed. Extension 14 rotatably holds a cylindrical insert 16 having a D-shaped hole 18. Insert 16 is captured by a C-shaped washer 20 (shown in FIG. 3). An O-ring 22 is disposed inside extension 14 to seal the interior of the sensor 10. A portion of the cap 13 is indented to define with wall 12 a finger 24 as seen in FIGS. 2 and 3.

Inside sensor 10 is a tubular space 26 is formed with internal threads 28 extending from end 15. A threaded screw 30 is disposed in space 26 at the end adjacent to wall end 15. An O-ring 32 seals the space 26 from ambient atmosphere. The screw 30 has an internal spherical wall 34. Also in space 26 is a metallic sleeve 36. The sleeve 36 is floating with respect to wall 12 and is maintained in position by a resilient ring 38. Within sleeve 36 there is an inertial mass in the form of a ball 40. Ball 40 is biased against surface 34 as described below. The diameter of the ball is substantially equal to the diameter of sleeve 36 so that as the ball moves through the seal, its motion is damped by the air within the sleeve. Opposite to surface 34, cap 13 is formed a spherical surface as at 42 to form a stop for ball 40. Thus a linear path is formed for ball 40 from surface 34 to surface 42. This path is parallel with, but offset from the longitudinal axis 44 of sensor 10.

A lever 46 is mounted on a shaft 48 inside the sensor 10. The lever has two opposed arms 50, 52. Mounted on end 15 there is a toroidal compressing spring 54 with a cap 56. Cap 56 is pushed by spring 54 to urge arm 50 to the left, as seen in FIG. 3. As a result of this biasing force, opposite arm 54 pushes ball 40 to the right, against wall 34, as shown in FIG. 3.

Figure 4:
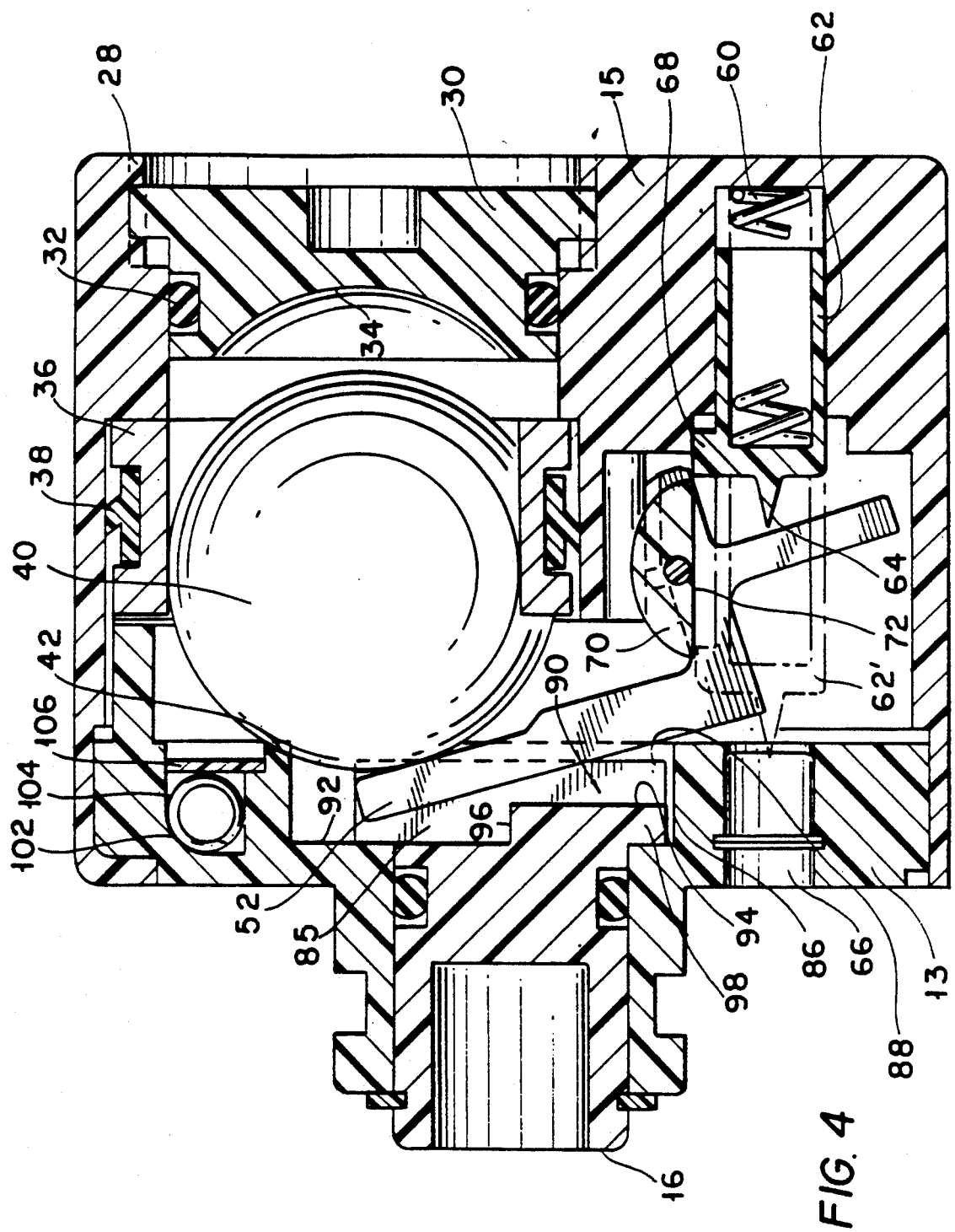
FIG. 4 shows another side sectional view of the sensor with the ball in a second position.

As shown in FIG. 4, also mounted on end 15, there is another compression spring 60 terminating in a cap 62 with a spike 64. Opposite cap 62, cap 13 holds a primer charge 66. Cap 62 has a flange. Importantly, adjacent to cap 62, shaft 48 is formed with a D-shaped disk 70 with a flat surface 72.

The sensor is provided with another compression spring (not shown) terminated in a cap 74, D-shaped disk 76 and primer charge 80 on the other side of lever 46. The ends of shaft 48 are mounted in journals 82, 84 which allow the shaft 48 to pivot. As a result, when the sensor is armed, arm 52 may pivot from a first position shown in FIG. 3 wherein it pushes ball 40 against wall 34 to a second position shown in FIG. 4 wherein ball 40 is in contact with wall 42. In this second position, arm 52 is disposed in a cavity 85 formed in cap 13 as follows.

Figure 5:
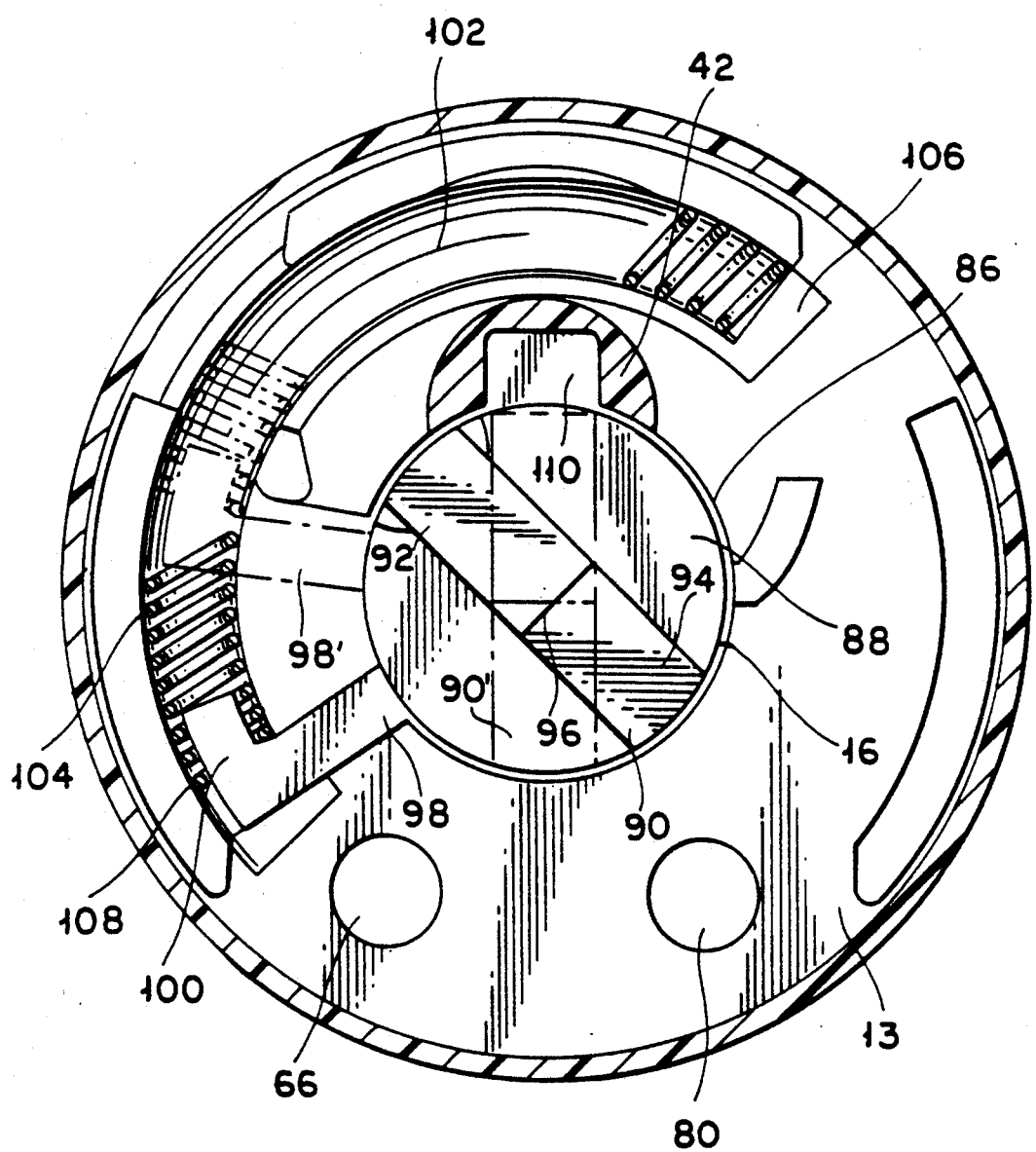
FIG. 5 shows a cross-sectional view taken along line 5—5 in FIG. 1.
Figure 6:
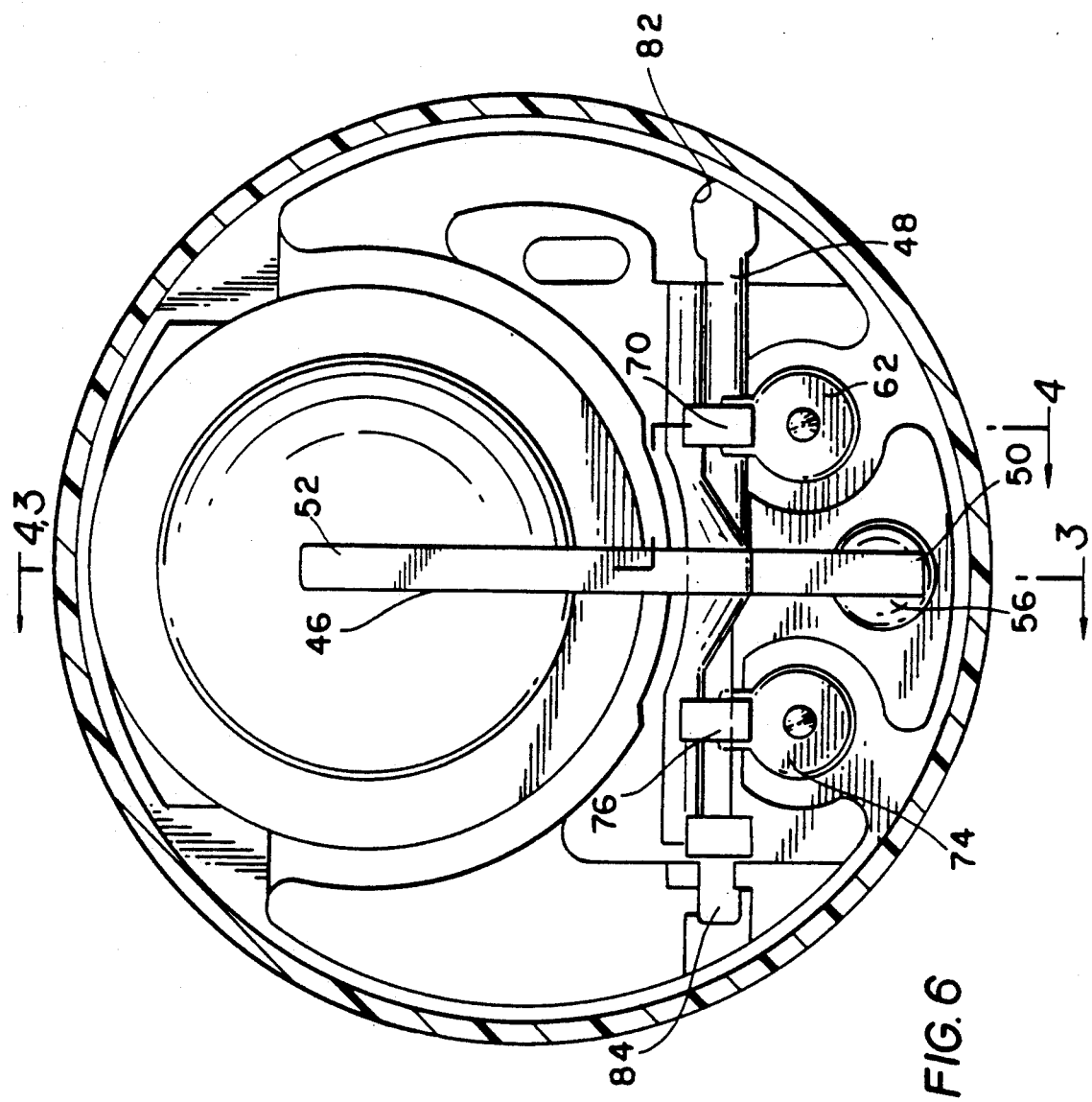
FIG. 6 shows a cross-sectional view taken along line 6—6 in FIG. 1.

As shown in FIG. 5, cap 13 is provided with a central hole 86 for holding insert 16. The bottom surface 88 of insert 16 is provided with a rectangular cut 90 having a width slightly greater than the width of lever arm 46. Preferably, as seen, in FIG. 5, cut 90 has two levels 92, 94 separated by a wall 96. Insert 16 is also provided with an extension 98 extending radially and terminating in a tangential arm loop. Cap 13 also has a arcuate cut 102 holding a compression coil spring 104. Spring 104 is held in cut 102 by a plate 106. One end 108 of spring 104 is in contact with arm 100 of extension 98 as shown. Cap 13 is also formed With a cut 110 having a width equal to the width of cut 90. Cut 90 is made so that it extends through surface 42.

As previously mentioned, insert 16 is rotatable within cap 13. When the sensor is not installed in place, spring 104 pushes extension 98 counterclockwise to the position shown in FIG. 5. In this position cut 92 is angularly displaced from cut 110. As a result, as shown in FIG. 3, surface 88 acts as a stop which does not permit arm 52 to move into cavity 85. Thus even if the sensor 10 is accidentally activated, for example by dropping it, or hitting it with a hammer, the sensor will not go off, as explained more fully below.

Figure 1:
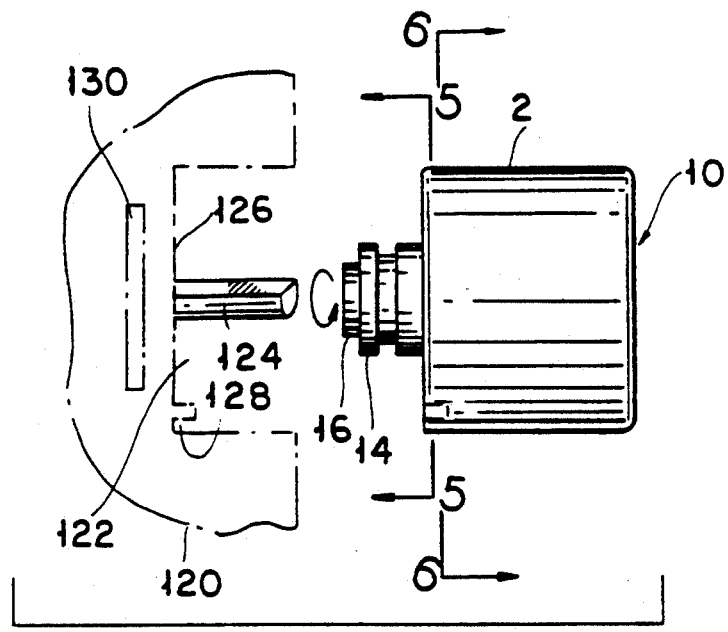
FIG. 1 shows a side view of a sensor constructed in accordance with this invention, as it is being installed in a passenger restraint system.

Once the sensor is assembled, it is ready to be installed in a passenger restraint system. This system 120, a partial view of which is shown in FIG. 1, includes a cavity 122 constructed and arranged to hold sensor 10. More specifically, cavity 122 includes a rod 124 extending from the floor 126. Rod 124 has a D-shaped cross-section for matching the hole 18 in insert 16. On one side, cavity 122 is also provided with a hole 128 to hold finger 24 (shown in FIG. 3). Thus hole 128 and finger 24 cooperate to form a detent or indexing means for the sensor. Sensor 10 is installed by first positioning and mounting it over shaft 124. In this position, the sensor is still unarmed, i.e. arm 98 is in position shown in solid lines in FIG. 5. In this position, the finger 24 is not aligned with hole 128 and therefore the sensor cannot be seated into cavity 120. In order to complete the installation, the sensor is turned to bring the finger 24 in alignment with hole 128 and then the sensor is pushed in so that it is fully seated. Importantly, while the sensor 10 is rotated with respect to the fixed shaft 124, since the shaft 124 is coupled to insert 16, the insert also remains fixed. As a result, the sensor together with the cap 13 rotates with respect to the insert 16 until arm 98 reaches the position 98' shown in dotted lines in FIG. 5. In this position, cut 90 is also rotated to position 90' in which it is aligned with cut 110. Therefore once the sensor is seated within the passenger restraint system 120, cut 92 is shifted angularly to complete cavity 85. In this configuration, the lever is free to move fully to the second position shown in FIG. 4. In this position the sensor is fully armed.

Once the sensor 10 is installed and armed as described above, it is ready for operation. During normal operation of the motor vehicle, ball 40 is biased against wall 34 by lever 50. In this position, the D-shaped disks 70, 76 keep the caps 62 and 74 in the position shown in FIG. 4. When the vehicle is involved in a crash resulting a large velocity change, the ball 40 is subjected to a force large enough to overcome the biasing the spring 54. The exact speed change at which the ball starts moving may be adjusted by changing the position of screw 30. In response to this force, ball 40 moves from the first position shown in FIG. 3 to the second position shown in FIG. 4 and pivots lever 50 counterclockwise. As a result of this pivoting motion, the D-shaped disks 70, 76 rotate in a position which allow the caps 62, 74 to move towards cap 13. Because of the force generated by spring 60 (and the spring not shown but coupled to cap 74) caps 62, 74 then hit the primer capsules 66, 80. As a result the primer capsules are set off and ignite the gas generator compound 130 in the passenger restraint system.

Obviously numerous modifications may be made to this invention without departing from its scope as defined in the appended claims.

We claim:

1. A crash sensor for a motor vehicle comprising:
   a housing defining a path of movement between a first and a second position;
   a mass disposed in said housing for movement along said path;
   biasing means for biasing said mass toward said first position;
   crash indication means for indicating a crash when said mass is at said second position;
   blocking means for blocking said crash indication means,
   said blocking means including a blocking element movable between an armed and a disarmed position; and arming means for automatically arming said sensor by deactivating said blocking means, said arming means including an arming member detached from said housing and attached to said motor vehicle and a rotatable member extending into said housing for selectively moving said blocking member between said armed and disarmed positions when said housing is installed in the motor vehicle.

2. The crash sensor of claim 1 wherein said blocking means further comprises a blocking spring for urging said blocking member toward said armed position.

3. The crash sensor of claim 1 wherein said blocking member is rotatable between said armed and disarmed positions along an axis parallel to said path.

4. The crash sensor of claim 1 wherein said rotatable member is a cylindrical insert.

5. The crash sensor of claim 4 wherein said insert has a central hole for receiving said arming member.

6. The crash sensor of claim 5 wherein said hole and said arming member have complementary cross sections.

* * * * *